United States Patent
Manger

(12) United States Patent (10) Patent No.: US 7,722,201 B2
Manger (45) Date of Patent: May 25, 2010

(54) FLEXIBLE, REVERSIBLE AND ADJUSTABLE FLASH SNOOT

(75) Inventor: Mark Andrew Manger, 1856 W. 35th Ave., Denver, CO (US) 80211

(73) Assignee: Mark Andrew Manger, Denver, CO (US)

(*) Notice: Subject to any disclaimer, the term of this patent is extended or adjusted under 35 U.S.C. 154(b) by 88 days.

(21) Appl. No.: 12/049,269

(22) Filed: Mar. 15, 2008

(65) Prior Publication Data

US 2008/0239695 A1 Oct. 2, 2008

Related U.S. Application Data

(60) Provisional application No. 60/909,252, filed on Mar. 30, 2007.

(51) Int. Cl.
*G03B 15/02* (2006.01)
*F21V 11/00* (2006.01)

(52) U.S. Cl. .......................... 362/18; 362/16; 362/356; 396/155

(58) Field of Classification Search ............. 362/16, 362/18, 351, 352, 356; 396/155, 174, 178, 396/429, 534
See application file for complete search history.

(56) References Cited

U.S. PATENT DOCUMENTS

| 5,089,945 | A | * | 2/1992 | Mula | 362/261 |
| 5,311,409 | A | * | 5/1994 | King | 362/17 |
| 5,651,602 | A | | 7/1997 | Tawil et al. | |
| 5,778,264 | A | * | 7/1998 | Kean | 396/174 |
| 5,803,571 | A | | 9/1998 | McEntyre et al. | |
| 5,915,828 | A | | 6/1999 | Buckley | |
| 6,286,555 | B1 | * | 9/2001 | Pauker et al. | 138/109 |
| 6,508,776 | B2 | * | 1/2003 | Chiang et al. | 602/5 |
| 7,311,261 | B1 | * | 12/2007 | Kennedy et al. | 235/462.22 |
| 7,360,909 | B1 | * | 4/2008 | Hughes | 362/18 |
| 2006/0109640 | A1 | * | 5/2006 | Fong | 362/16 |

\* cited by examiner

*Primary Examiner*—Jong-Suk (James) Lee
*Assistant Examiner*—David R Crowe

(57) ABSTRACT

A device for controlling projected light beam from an electronic flash, this invention consists of a tube of elastic material such as neoprene or polyurethane (4), with a light side (6) and a dark side (5). The shape and elasticity of this device allow its configuration to change by rolling the snoot over on itself. Rolling the snoot partially upon itself, changing its length, will thereby change the size of the projected light beam. Rolling the snoot inside out will select a different interior reflectivity, thus a different quality of projected light.

1 Claim, 5 Drawing Sheets

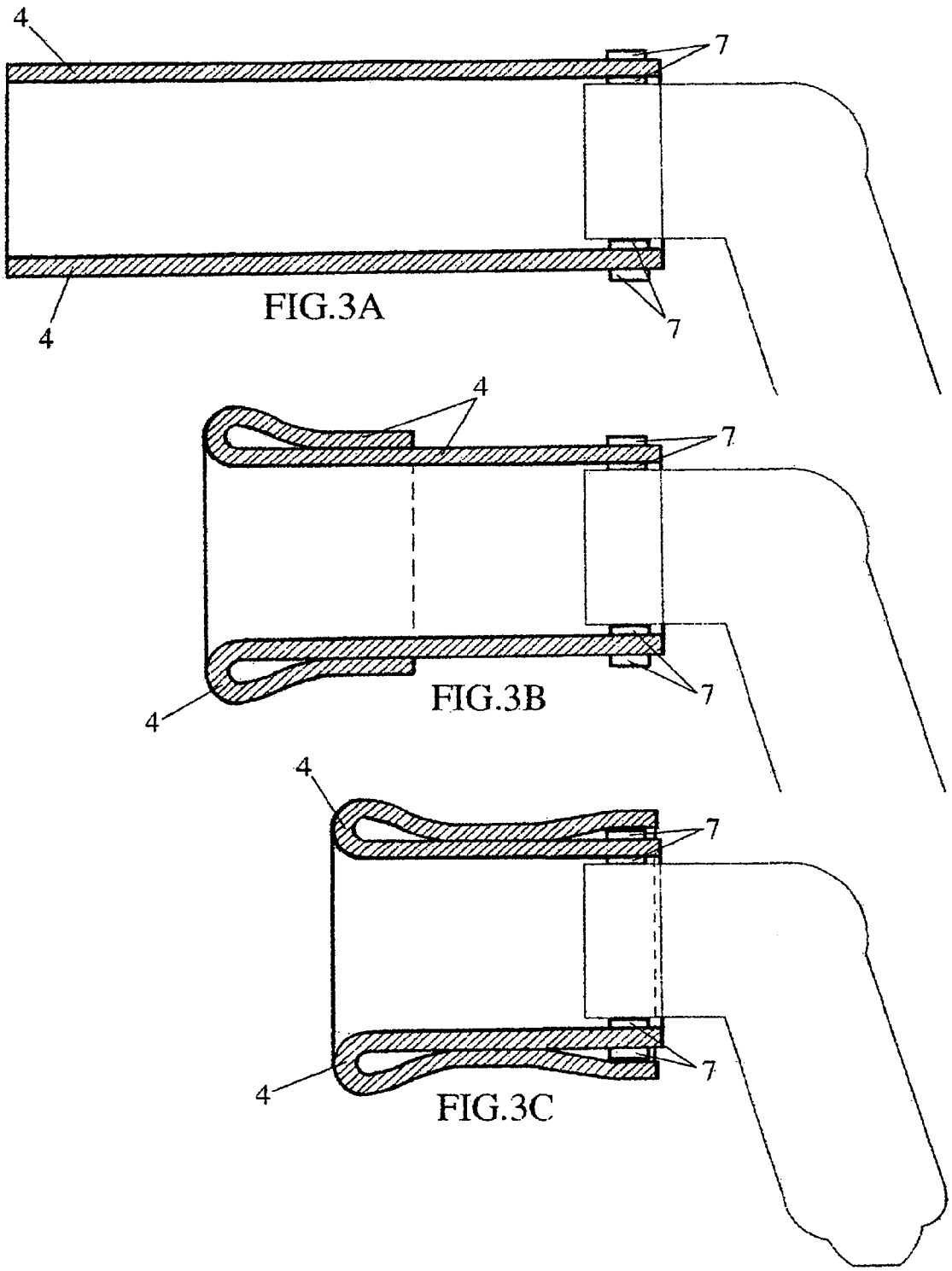

FLEXIBLE, REVERSIBLE AND ADJUSTABLE FLASH SNOOT

CROSS REFERENCE TO RELATED APPLICATIONS

This Application claims the benefit of provisional patent application No. 60/909,252 filed Mar. 30, 2007 by the present inventor.

FEDERALLY SPONSORED RESEARCH

Not applicable

SEQUENCE LISTING OR PROGRAM

Not applicable

RELATED APPLICATIONS

| | | | |
|---|---|---|---|
| 5803571 | I-snoot | Sep. 08, 1998 | McEntyre & London |
| 5915828 | Motion Picture Lighting Fixture | Jun. 29, 1999 | Buckley |
| 5651602 | Portable Light Diffuser | Jul. 29, 1997 | Tawil & Litt |

BACKGROUND OF INVENTION

1. Field of the Invention

This invention relates generally to controlling the light cast from electronic flash devices.

2. Prior Art

The art of lighting for photography and film is a craft often encumbered by specialized equipment, which requires a balance of portability and utility in its design. Ideally, the photographic artist's need for any given tool should not be overwhelmed by the devices complexity, cumbrous or cost. A snoot is a lighting tool that confines the light emitted from a light source to an area determined by the length of the snoot, size of the opening, and distance to the subject illuminated. Snoots with a light, reflective interior will cast light with a softer edge, or fall-off, than a snoot with a dark, non-reflective interior, as explained in the lighting assembly described in U.S. Pat. No. 5,915,828. In filmmaking, snoots tend to be made from metal sheeting. Their annulus may be adjusted as in U.S. Pat. No. 5,803,571 or their length may telescope as in U.S. Pat. No. 5,651,602 or sections may be added or subtracted as in U.S. Pat. No. 5,915,828. In still photography, the aforementioned solutions to snoot adjustability, is simply too cumbersome for a photographer working on location. Snoots for still photography need to fit easily onto a variety of electronic flashes and fit unobtrusively within a camera bag. While commonly manufactured flash snoots are made from fabric or cardboard and plastic and are made to be collapsible and portable, they have a number of disadvantages:

a) Hook-and-loop fasteners are required to connect them to the light source. This can mean permanently adhering a hook or loop strip to the electronic flash, or using a separate adapter to connect the snoot to the flash.

b) These snoots lack an inherent continuous adjustability; broader beams are only achieved by using a separate, shorter snoot.

c) Inner reflectivity on these snoots is fixed and not designed to change.

ADVANTAGES

Advantages of this invention lie in the following:

a) It is designed to adjust projected beam size by temporarily changing its length, eliminating the need for carrying snoots of different sizes.

b) The desired effects of either a highly reflective or light absorbing interior can be taken advantage of with a single snoot. This eliminates the need for carrying snoots with different interior reflectivity.

c) The elasticity of this invention allows it to stretch quietly in place over the flash, without hook and loop fasteners or additional adapters.

d) The inventions elasticity will also give photographers the option to add any suitable shape, grid or colored gel to the open end of the snoot. This gives the photographer creative options in using the invention.

e) Cost of production is low. It can be manufactured domestically and remain competitively priced with snoots made overseas.

This invention has been marketed through the website www.zootsnoot.com under the benefit of its provisional patent. Sales and feedback have shown that this invention is desirable and viable as a product.

SUMMARY

The invention is an improved light snoot for photographic flashes. The improvement is gained by constructing the snoot from flexible, elastic material that can be rolled to adjust projected light beam concentration and reversed to change interior reflectivity, and thus light fall-off, which has been unavailable through a single flash snoot. More than portable, this invention has use inside of a camera bag as well; it provides excellent cushioning and abrasion resistance around or between photographic equipment.

DRAWINGS—FIGURES

FIG. 1A shows the snoot at full length.

FIG. 1B shows the snoot partially rolled from the flash side.

FIG. 1C shows the snoot partially rolled from the open end.

FIG. 1D shows the snoot rolled to its shortest with the light side folded completely over the dark side.

FIG. 2A shows the snoot at full length.

FIG. 2B shows the snoot partially rolled from the flash side.

FIG. 2C shows the snoot partially rolled from the open end.

FIG. 2D shows the snoot rolled to its shortest with the dark side folded completely over the light side.

FIG. 3A shows a cross section of the snoot mounted on a flash at full length.

FIG. 3B shows a cross section of the snoot mounted on a flash and partially rolled.

FIG. 3C shows a cross section of the snoot mounted on a flash and rolled to shortest length.

DRAWINGS—REFERENCE NUMBERS

4 Elastic material such as neoprene

5 Dark, non-reflective material

Figure 1A:
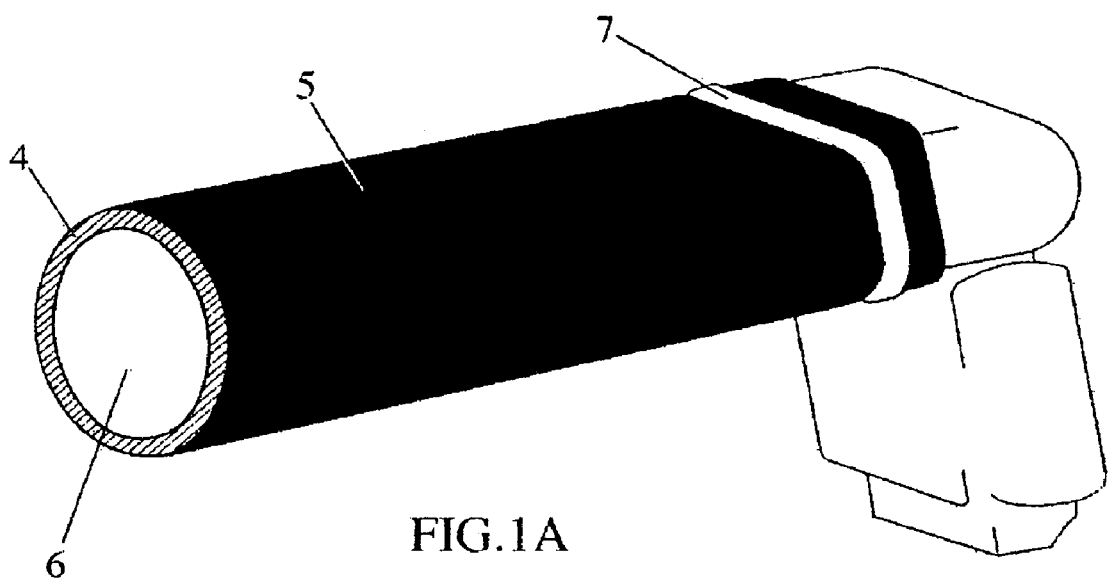
FIGS. 1A to 1D show the snoot on an electronic flash in various configurations with the light reflective interior.

6 Light reflective material
7 Silicone bead to help the snoot grip the light source

DESCRIPTION OF THE INVENTION

The invention is made from a squared-cornered sheet of elastic material, such as 5 mm neoprene fabric 4, with a dark surface on one side 5 and a light surface on the other 6. Dimensions of the sheet will vary based on desired snoot size. A silicone bead, approximately ¼-½" wide is applied 7, running the width of the sheet, near the same edge on both sides and allowed to cure. This silicone will help the snoot grip its light source securely. A flat jig, approximately 2" wide, is placed down the middle of the sheet, bisecting the silicone bead. A durable adhesive is applied to the edges of the sheet on either side of the jig. The glued edges are folded across the jig, and the two edges are forced straight together. The adhesive is allowed to cure. The finished snoot is removed from the jig.

Figure 1B:
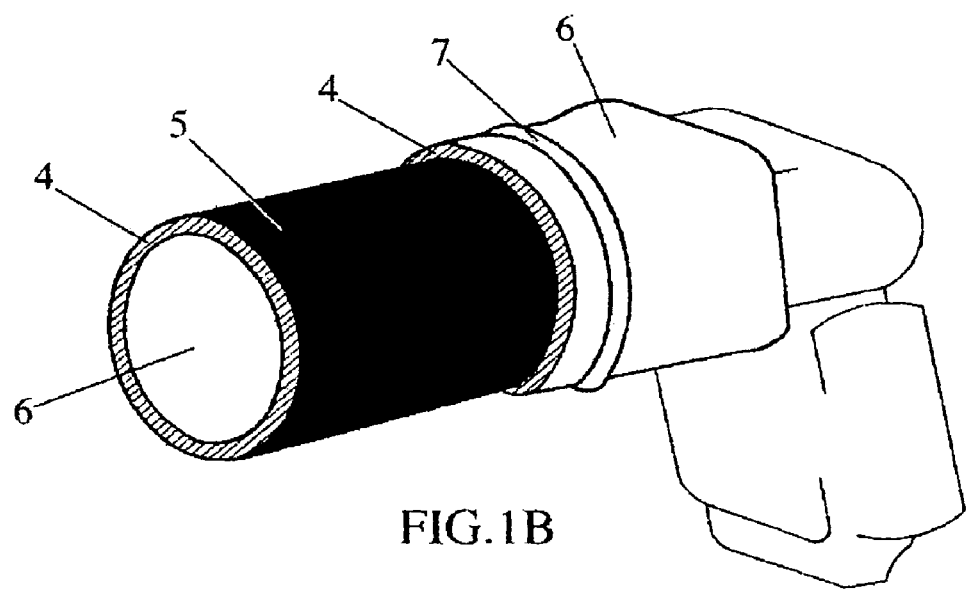
Figure 1C:
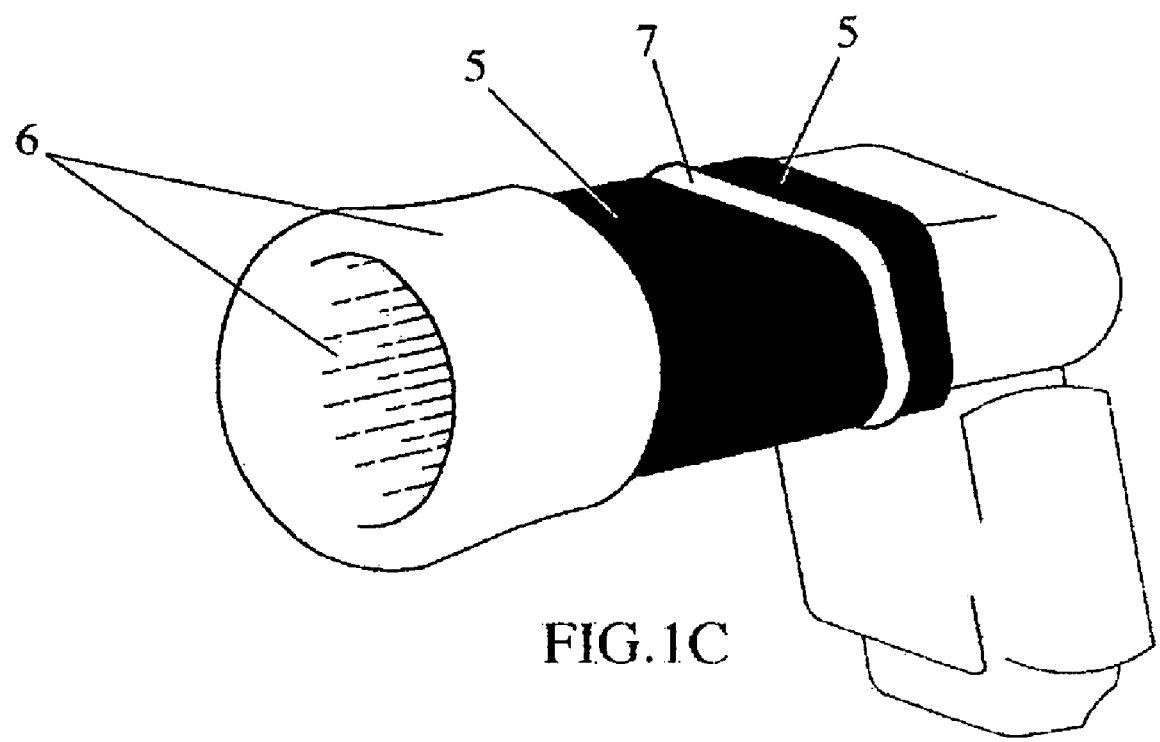
Figure 1D:
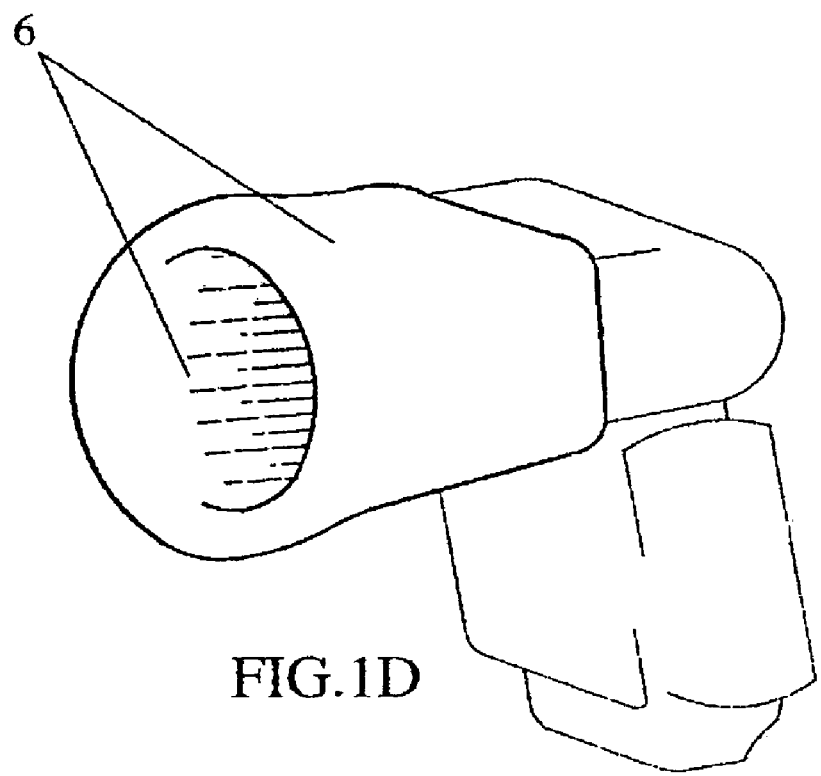

The end of the snoot with the silicone bead 7 is stretched around the flash head with the white side 6 in as in FIG. 1A. The flash is preferably placed away from the camera, synchronized with the camera and aimed at the subject of the photograph. The image is made with the flash producing a tight beam of light with some softness to the edge of the projected light. The beam is made wider by rolling the snoot out, partially upon itself as in FIG. 1B or 1C. The width of the beam is continuously adjustable with its widest projected light produced by the snoots shortest length configuration illustrated in FIG. 1D.

Figure 2A:
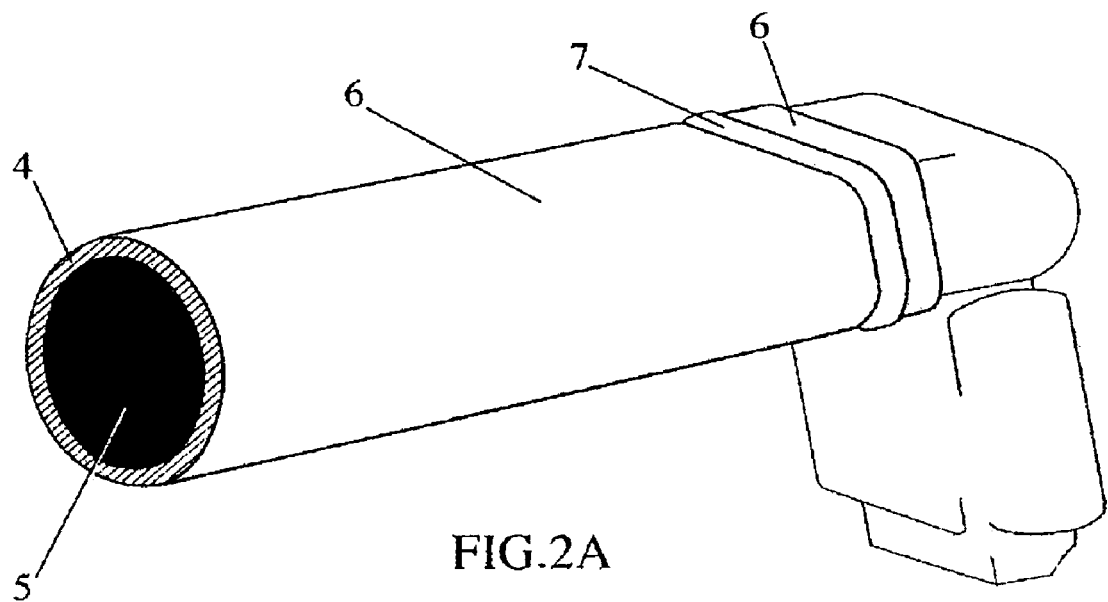
FIGS. 2A to 2D show the snoot on an electronic flash in various configurations with the dark non-reflective interior.
Figure 2B:
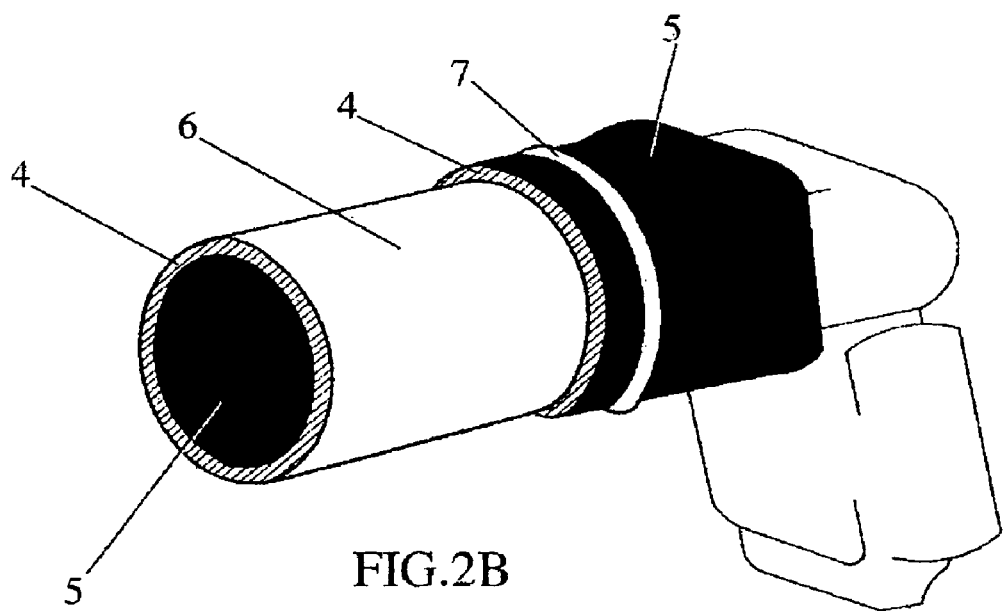
Figure 2C:
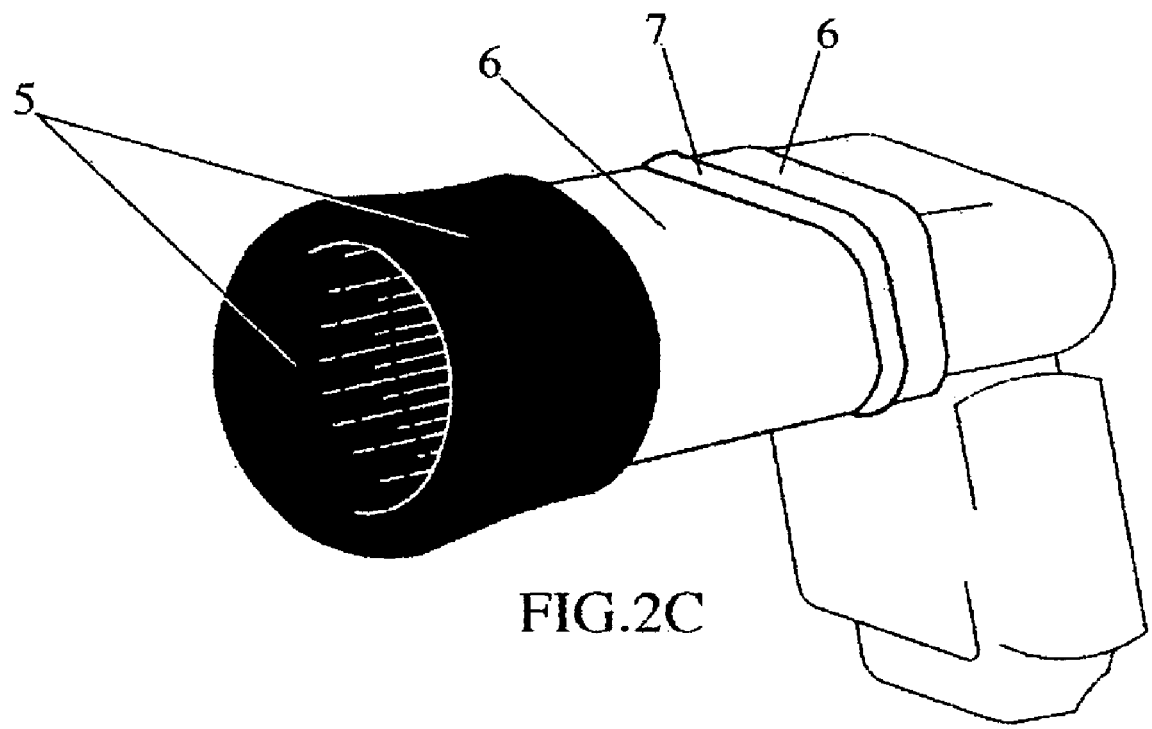
Figure 2D:
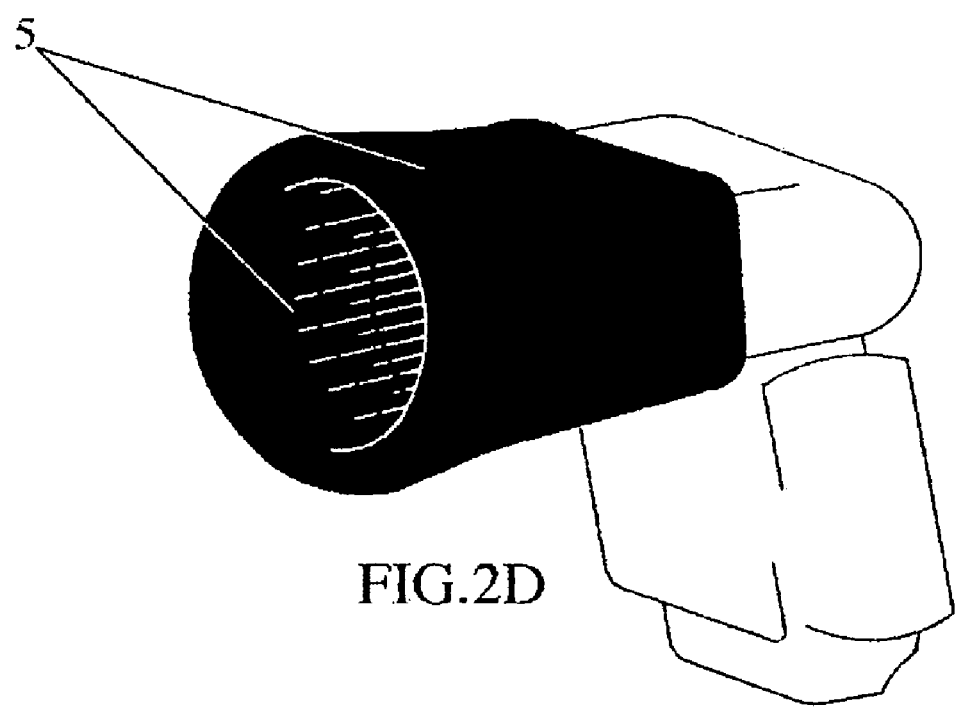

Rolling the snoot inside out, so that the darker side 5 lines the interior of the tube as in FIG. 2A, produces a narrow beam with an edge to the projected light. This projected beam is also made wider by rolling the snoot upon itself to the desired length as in FIG. 2B or 2C. Its widest beam projection is achieved through its shortest configuration as FIG. 2D illustrates.

Accordingly, the snoot is simply and securely connected to the flash without additional connectors. Any adjustments to snoot length, thus projected beam size, is easily gained. Light fall-of produced by the interior reflectivity of the snoot, can be changed in seconds.

What is claimed is:

1. A light-restricting device for a photographic flash comprising: a neoprene tube with sufficient stiffness to hold a hollow form with round openings and sufficient elasticity to allow a partially rolled configuration, to produce an adjustably restrictive light-beam projection; said tube further including a light colored surface and a dark colored surface on each broad reversible side of said tube, with the light colored surface reflecting gradual light fall-off of a projected beam from the flash, and the dark colored surface absorbing light to produce a confined projected beam from the flash; and said tube further including a silicone band around the circumference, near one end, of the tube, to work with the elasticity of the tube to grip the photographic flash.

* * * * *